United States Patent
Galan-Oliveras et al.

(10) Patent No.: US 11,359,926 B2
(45) Date of Patent: Jun. 14, 2022

(54) TECHNOLOGIES FOR AUTONOMOUS DRIVING QUALITY OF SERVICE DETERMINATION AND COMMUNICATION

(71) Applicant: Intel Corporation, Santa Clara, CA (US)

(72) Inventors: Magdiel F. Galan-Oliveras, Gilbert, AZ (US); Rita Chattopadhyay, Chadler, AZ (US); Subramanian Anandaraj, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 16/143,894

(22) Filed: Sep. 27, 2018

(65) Prior Publication Data

US 2019/0049259 A1    Feb. 14, 2019

(51) Int. Cl.
*G01C 21/34* (2006.01)
*G05D 1/00* (2006.01)

(52) U.S. Cl.
CPC ..... *G01C 21/3461* (2013.01); *G01C 21/3407* (2013.01); *G01C 21/3415* (2013.01); *G01C 21/3492* (2013.01); *G05D 1/0088* (2013.01); *G05D 2201/0213* (2013.01)

(58) Field of Classification Search
CPC ............ G01C 21/3461; G01C 21/3407; G01C 21/3415; G01C 21/3492; G05D 1/0088; G05D 2201/0213
See application file for complete search history.

(56) References Cited

U.S. PATENT DOCUMENTS

| | | | |
|---|---|---|---|
| 9,507,346 B1* | 11/2016 | Levinson | G05D 1/0291 |
| 9,796,388 B2 | 10/2017 | Tseng et al. | |
| 10,042,359 B1* | 8/2018 | Konrardy | B60W 30/16 |
| 10,324,463 B1* | 6/2019 | Konrardy | G01S 19/14 |
| 10,451,428 B2* | 10/2019 | Lathrop | G05D 1/02 |
| 10,479,356 B1* | 11/2019 | Haque | B60W 30/095 |
| 2017/0059335 A1* | 3/2017 | Levine | G06F 16/29 |

(Continued)

OTHER PUBLICATIONS

Extended European search report for European patent application No. 19183095.9, dated Jan. 17, 2020 (11 pages).

*Primary Examiner* — Yazan A Soofi
*Assistant Examiner* — Naeem Taslim Alam
(74) *Attorney, Agent, or Firm* — Alliance IP, LLC

(57) ABSTRACT

Technologies for autonomous vehicle driving quality of service (QoS) determination and communication include an advanced vehicle with a vehicle computing device. The computing device determines multiple route segments of one or more routes to a destination. The computing device determines, for each route segment, one or more autonomous driving factors that are each indicative of an autonomy level achievable by the advanced vehicle for the associated route segment. Factors may include map availability, weather conditions, road conditions, or other factors. The computing device determines, for each route segment, an autonomous QoS score based on the autonomous driving factors. The computing device may rank multiple routes to the destination based on the autonomous QoS scores associated with the route segments of those routes. The computing device may display a proposed route to a user of the advanced vehicle and receive a selection from the user. Other embodiments are described and claimed.

18 Claims, 5 Drawing Sheets

(56) References Cited

U.S. PATENT DOCUMENTS

| | | | |
|---|---|---|---|
| 2017/0356747 A1* | 12/2017 | Iagnemma | G01C 21/3461 |
| 2018/0056991 A1* | 3/2018 | Sogen | G05D 1/0214 |
| 2018/0266833 A1* | 9/2018 | Carlson | G01C 21/3667 |
| 2019/0049257 A1* | 2/2019 | Westover | G01C 21/28 |
| 2019/0339709 A1* | 11/2019 | Tay | G05D 1/0088 |
| 2020/0042013 A1* | 2/2020 | Kelkar | G05D 1/0287 |
| 2020/0057451 A1* | 2/2020 | Robert | G01C 21/32 |

\* cited by examiner

US 11,359,926 B2

TECHNOLOGIES FOR AUTONOMOUS DRIVING QUALITY OF SERVICE DETERMINATION AND COMMUNICATION

BACKGROUND

Modern vehicles may include many types of advanced drive capabilities. Those capabilities allow the vehicle to perform movements without direct control of the driver. For example, some vehicles include parking assist, which allows the vehicle to control acceleration, brake, and steering inputs required to move the vehicle into a nearby parking spot. Some vehicles include smart cruise control or active collision warning and avoidance systems that may detect nearby obstructions and/or initiate evasive actions. Indeed, some vehicles include full self-driving capabilities. SAE International and the National Highway Traffic Safety Administration (NHTSA) have proposed a six-level classification system for different levels of vehicle automation, ranging from Level 0 (no automation) to Level 5 (full automation).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
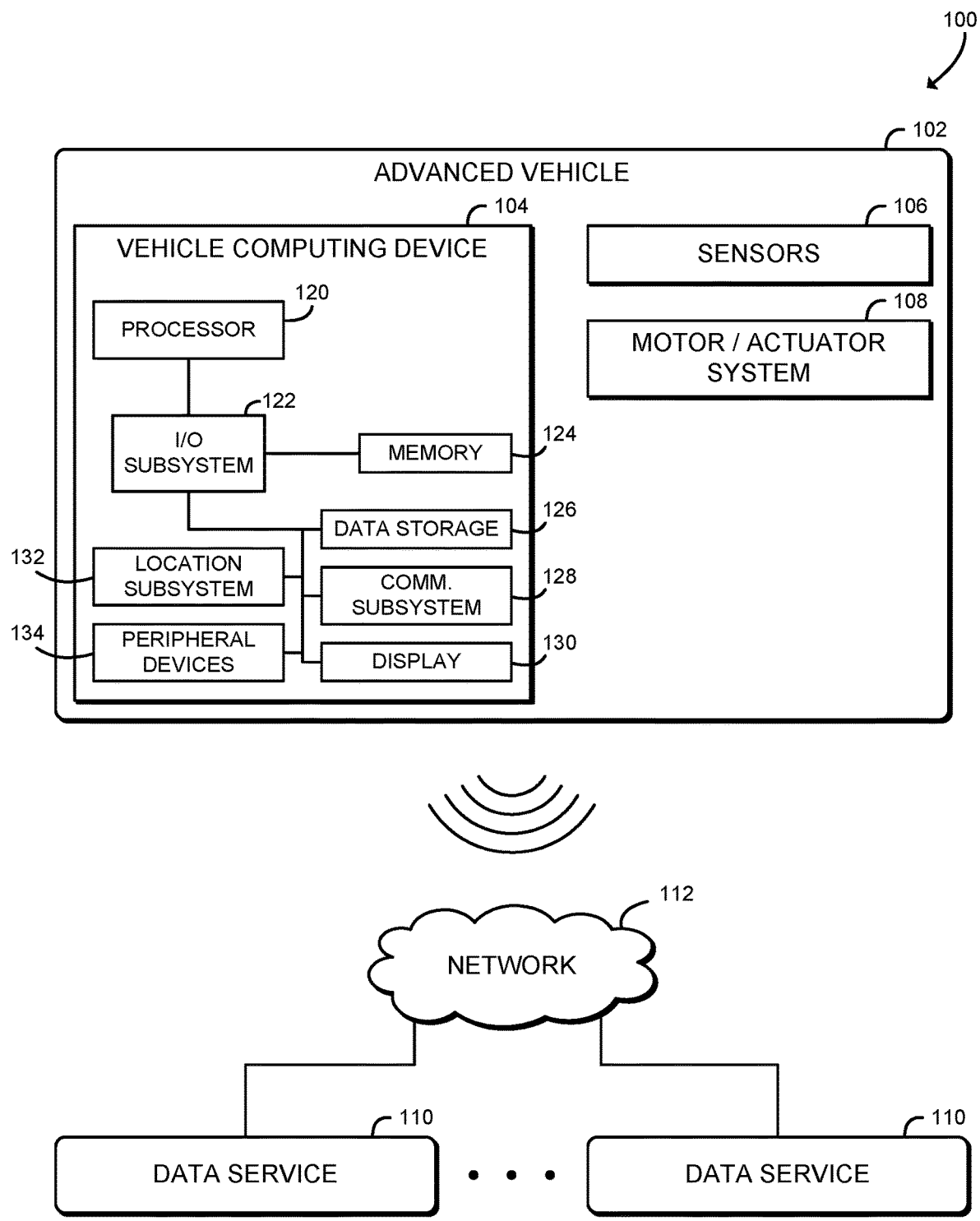
FIG. 1 is a simplified block diagram of at least one embodiment of a system for autonomous vehicle quality of service determination and communication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for autonomous driving quality of service (QoS) determination and communication includes an advanced vehicle 102 that includes a vehicle computing device 104. The vehicle computing device 104 may communicate with one or more external data services 110 over a network 112. In use, as described further below, the vehicle computing device 104 determines multiple route segments for potential routes to a destination. The vehicle computing device 104 determines an autonomous driving quality of service (QoS) score for each route segment, which is based on the driving autonomy level achievable by the advanced vehicle 102 for each route segment. Based on the QoS scores, the vehicle computing device 104 determines a proposed route to the destination, which may be confirmed by the user. As the advanced vehicle 102 drives the route to the destination, the vehicle computing device 104 may update QoS scores and the proposed route. Thus, the system 100 may allow the user to select a route to a destination based on the autonomous driving level achievable for each route segment, which may improve the convenience and/or usability of the advanced vehicle 102. The system 100 may further incorporate user preferences or other policies in route selection, which may further improve the autonomous driving experience for the user. In some embodiments, the system 100 may provide a guaranteed autonomous driving QoS for each route segment of a route, which may increase the feasibility or acceptability of autonomous driving for certain users, for example users who are incapable of driving.

The advanced vehicle 102 may be embodied as any type of car, truck, or other vehicle capable of performing one or more levels of vehicle automation, including driver assistance, partial automation, conditional automation, high automation, or full automation. For example, the advanced vehicle 102 may be capable of full autonomous driving from a starting position to a destination position, including full control of acceleration, steering, braking, collision avoidance, and other driving tasks of the advanced vehicle 102. As another example, the advanced vehicle 102 may be capable of autonomously or semi-autonomously parallel parking the advanced vehicle 102 or other parking assist tasks. As another example, the advanced vehicle 102 may provide adaptive cruise control, automated collision avoidance, or other automated driver aids. The level of vehicle automation achievable by the advanced vehicle 102 for a particular route segment may depend on available map data, weather conditions, vehicle and sensor health, and/or other autonomous driving factors. Illustratively, the advanced vehicle 102 includes the vehicle computing device 104, as well as one or more sensors 106 and a motor/actuator system 108.

The vehicle computing device 104 may be embodied as any type of computation or computer device capable of performing the functions described herein, including, without limitation, a computer, an electronic control unit (ECU), an in-vehicle infotainment (IVI) device, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, the vehicle computing device 104 illustratively includes a processor 120, an input/output subsystem 122, a memory 124, a data storage device 126, and communication circuitry 128. Of course, the vehicle computing device 104 may include other or additional components, such as those commonly found in a vehicle computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the vehicle computing device 104 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the vehicle computing device 104. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the vehicle computing device 104, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the vehicle computing device 104 may be embodied as any communication circuit, device, or collection thereof, capable of enabling communications between the vehicle computing device 104, the data services 110, and/or other remote devices over the network 112. The communication circuitry 128 may be configured to use any one or more communication technology (e.g., wired or wireless communications) and associated protocols (e.g., Ethernet, Bluetooth®, Wi-Fi®, WiMAX, LTE, etc.) to effect such communication.

As shown, the vehicle computing device 104 also includes a display 130, a location subsystem 132, and one or more peripheral devices 134. The display 130 of the vehicle computing device 104 may be embodied as any type of display capable of displaying digital information, such as a liquid crystal display (LCD), a light emitting diode (LED), a plasma display, a cathode ray tube (CRT), or other type of display device. As described further below, the display 130 may be used to present route information and other data to a user of the advanced vehicle 102, and in some embodiments the display 130 may include a touchscreen or other input device to receive user input. Although illustrated as being included in the vehicle computing device 104, it should be understood that in some embodiments the display 130 may be embodied as one or more separate components coupled to the vehicle computing device 104, such as an instrument cluster, an in-vehicle infotainment (IVI) device, or another display in a cabin of the advanced vehicle 102.

The location subsystem 132 of the vehicle computing device 104 may be embodied as any type of circuit capable of determining the precise or approximate position of the vehicle computing device 104 and, thus, the advanced vehicle 102. For example, the location subsystem 132 may be embodied as a global positioning system (GPS) receiver, capable of determining the precise coordinates of the vehicle computing device 104. In other embodiments, the location subsystem 132 may triangulate or trilaterate the position of the vehicle computing device 104 using distances or angles to cellular network towers with known positions, provided by the communication circuitry 128. In other embodiments, the location subsystem 132 may determine the approximate position of the vehicle computing device 104 based on association to wireless networks with known positions, using the communication circuitry 128.

As described above, the advanced vehicle 102 also includes multiple sensors 106 and a motor/actuator system 108. The sensors 106 may be embodied as any sensor or sensors capable of providing information about the position, nearby objects, or other attributes of the physical environment of the advanced vehicle 102 to the vehicle computing device 104. For example, the sensors 106 may include ultrasound, infrared, or laser rangefinders, visible- or infra-red-light cameras, three-dimensional LIDAR sensors, and/or RADAR sensors. In some embodiments, the sensors 106 may include short-range communications sensors capable of communication or identification of other advanced vehicles 102, such as visible light communication sensors. The sensors 106 may also provide sensor health data or other diagnostic data to the vehicle computing device 104.

The motor/actuator system 108 includes any control system capable of controlling movement of the advanced vehicle 102. The motor/actuator system 108 may include motor controllers, actuators, traction motors, and/or any other components that control the acceleration, braking, and steering of the advanced vehicle 102.

Each external data service 110 may be embodied as any computing device, or collection of computing devices, capable of providing information relevant to autonomous driving factors to the vehicle computing device 104. As such, each external data service 110 may be embodied as a single server computing device or a collection of servers and associated devices. For example, in some embodiments, each external data service 110 may be embodied as a "virtual server" formed from multiple computing devices distributed across the network 112 and operating in a public or private cloud. Accordingly, although each external data service 110 is illustrated in FIG. 1 as embodied as a single server computing device, it should be appreciated that each external data service 110 may be embodied as multiple devices cooperating together to facilitate the functionality described below. As such, each external data service 110 may include components and features similar to the vehicle computing device 104, such as a processor, I/O subsystem, memory, data storage, communication circuitry, and various peripheral devices, which are not illustrated in FIG. 1 for clarity of the present description.

As discussed in more detail below, the vehicle computing device 104, the external data services 110, and other components of the system 100 may be configured to transmit and receive data with each other and/or other devices of the system 100 over the network 112. The network 112 may be embodied as any number of various wired and/or wireless networks. For example, the network 112 may be embodied as, or otherwise include, a wired or wireless local area network (LAN), a wired or wireless wide area network (WAN), a cellular network, and/or a publicly-accessible, global network such as the Internet. As such, the network 112 may include any number of additional devices, such as additional computers, routers, and switches, to facilitate communications among the devices of the system 100.

Figure 2:
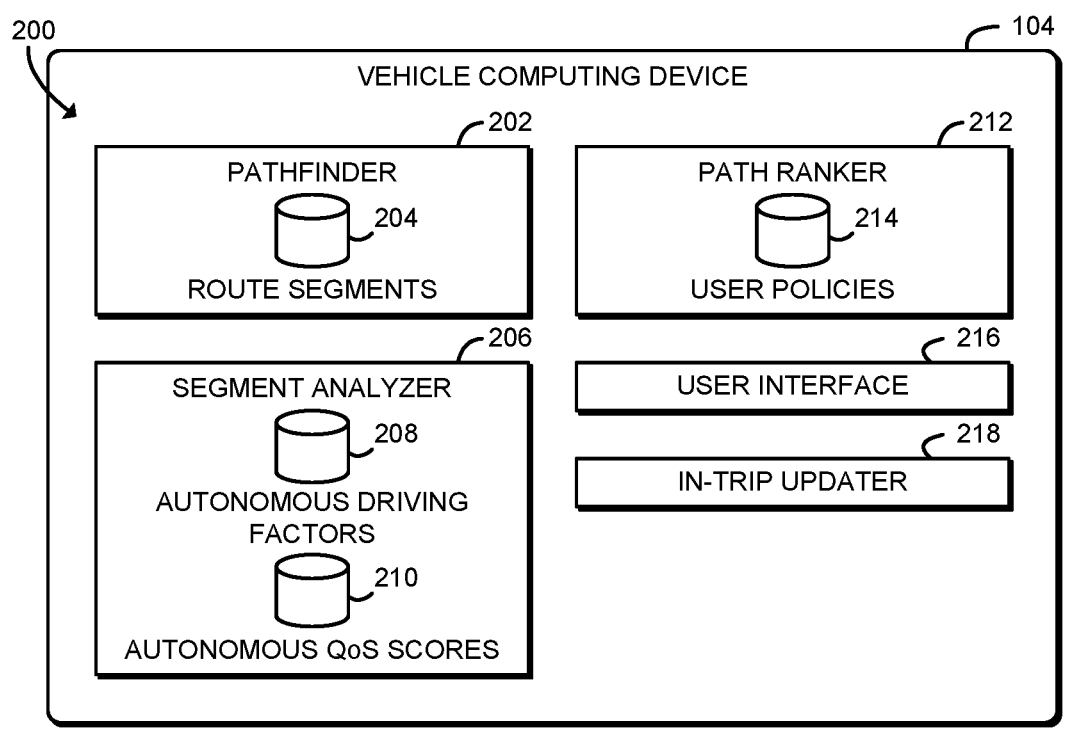
FIG. 2 is a simplified block diagram of at least one embodiment of an environment that may be established by a vehicle computing device the system of FIG. 1.

Referring now to FIG. 2, in an illustrative embodiment, the vehicle computing device 104 establishes an environment 200 during operation. The illustrative environment 200 includes a pathfinder 202, a segment analyzer 206, a path ranker 212, a user interface 216, and an in-trip updater 218. The various components of the environment 200 may be embodied as hardware, firmware, software, or a combination thereof. As such, in some embodiments, one or more of the components of the environment 200 may be embodied as circuitry or collection of electrical devices (e.g., pathfinder circuitry 202, segment analyzer circuitry 206, path ranker circuitry 212, user interface circuitry 216, and/or in-trip updater circuitry 218). It should be appreciated that, in such embodiments, one or more of the pathfinder circuitry 202, the segment analyzer circuitry 206, the path ranker circuitry 212, the user interface circuitry 216, and/or the in-trip updater circuitry 218 may form a portion of one or more of the processor 120, the I/O subsystem 122, and/or other components of the vehicle computing device 104. Additionally, in some embodiments, one or more of the illustrative components may form a portion of another component and/or one or more of the illustrative components may be independent of one another.

The user interface 216 is configured to receive a requested destination from a user of the vehicle computing device 104 (e.g., a driver, passenger, or other occupant of the advanced vehicle 102). The user interface 216 may be further configured to display a proposed route to the user and to receive a selected route from the user in response to displaying the proposed route. The proposed route may be determined as described further below. The user interface 216 may be further configured to alert the user of a change in the autonomous quality of service score associated with an upcoming route segment during a trip by the advanced vehicle 102.

The pathfinder 202 is configured to determine multiple route segments 204 of one or more routes to the destination. As described above, the destination may be requested by the user of the vehicle computing device 104.

The segment analyzer 206 is configured to determine, for each of the route segments 204, one or more associated autonomous driving factors 208. Each autonomous driving factor 208 is indicative of an autonomy level achievable by the advanced vehicle 102 for the associated route segment 204 and may include high-definition map availability, weather conditions, road conditions, traffic conditions, sensor capabilities, sensor health, and/or other factors. The segment analyzer 206 is further configured to determine, for each route segment 204, an autonomous quality of service (QoS) score 210 based on the associated autonomous driving factors 208. Each autonomous QoS score 210 may be determined, for example, as a weighted average of the autonomous driving factors 208 associated with a route segment 204.

The path ranker 212 is configured to rank multiple routes to the destination based on the autonomous QoS scores 210 associated with the route segments 204 of each route. The routes may be ranked based on one or more user policies 214, which may include a predetermined threshold autonomous QoS score 210, variation in autonomous QoS scores 210, historic driving data of the user, total time of the route, total distance of the route, or other criteria associated with the route. The path ranker 212 may be further configured to select a proposed route based on the ranking, which may be displayed by the user interface 216 as described above.

The in-trip updater 218 is configured to monitor the autonomous driving factors 208 for each of the route segments 204 during a trip by the advanced vehicle 102. In response to changes in the autonomous driving factors 208, the autonomous QoS scores 210 may be updated, the ranking of the routes to the destination may be updated, and/or a proposed re-routing may be determined in response to updating the ranking.

Figure 3:
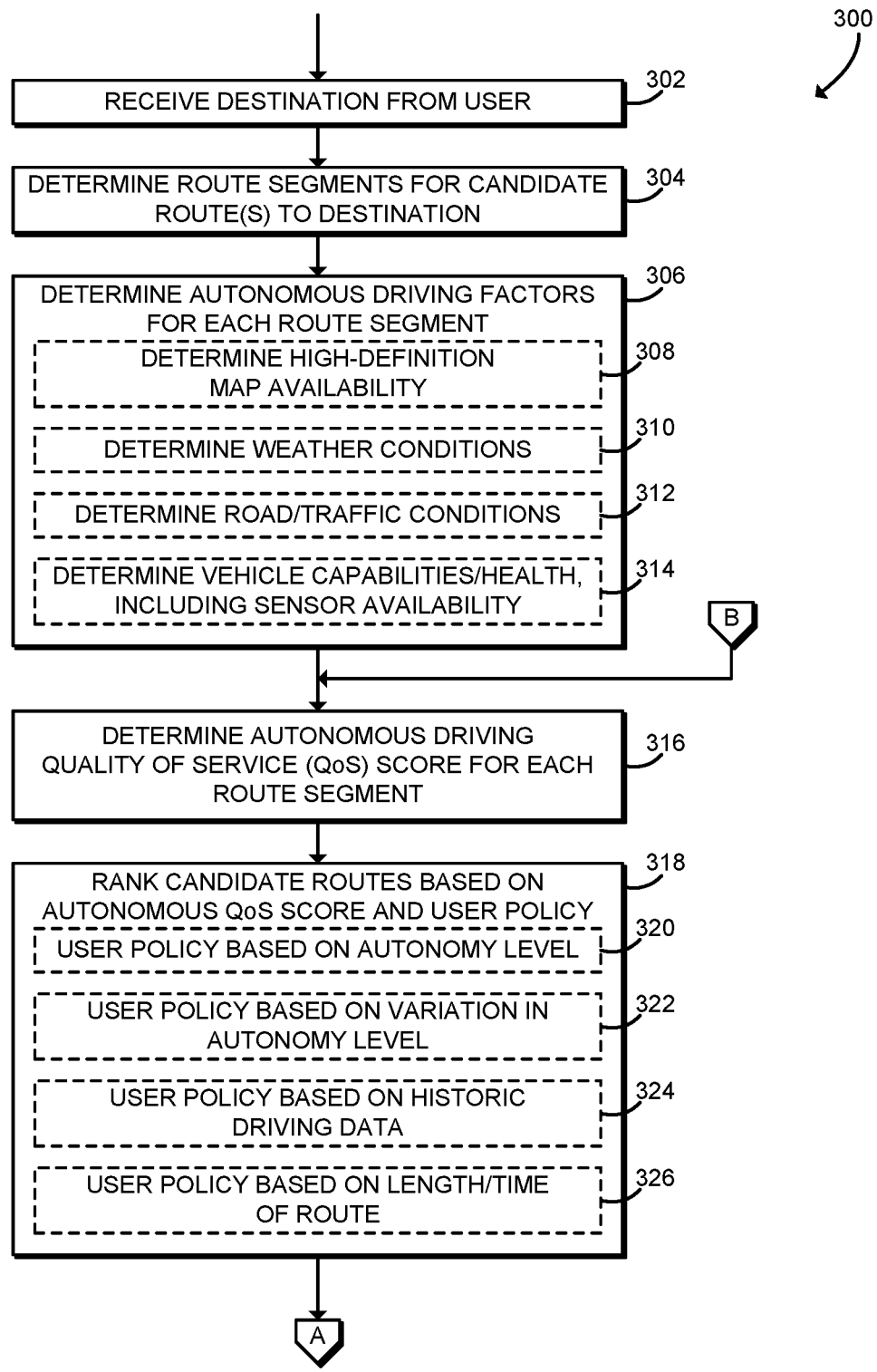
FIGS. 3 and 4 are a simplified flow diagram of at least one embodiment of a method for autonomous vehicle quality of service determination and communication that may be executed by the vehicle computing device of FIGS. 1 and 2.
Figure 4:
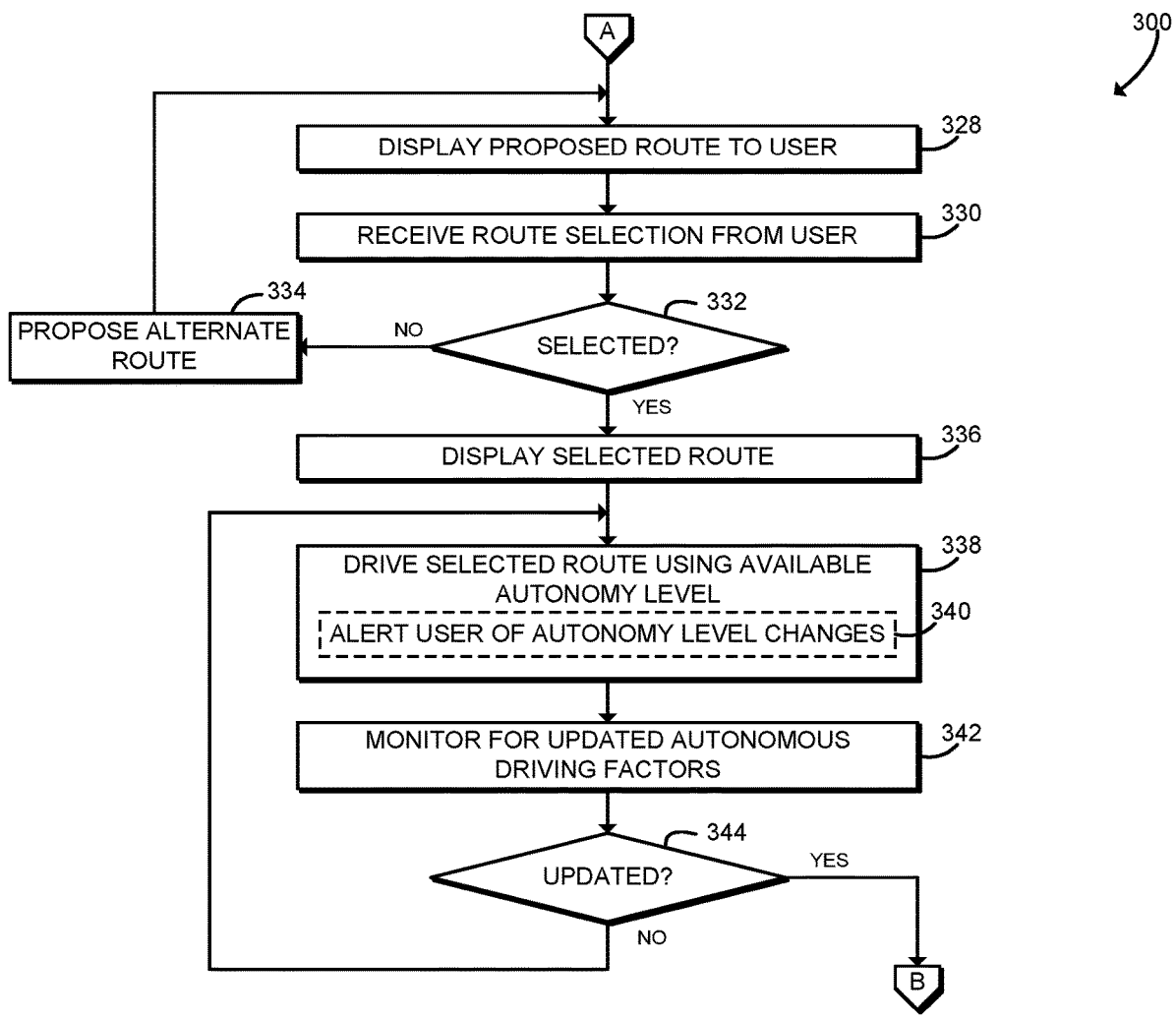

Referring now to FIGS. 3 and 4, in use, the vehicle computing device 104 may execute a method 300 for autonomous vehicle QoS determination and communication. It should be appreciated that, in some embodiments, the operations of the method 300 may be performed by one or more components of the environment 200 of the vehicle computing device 104 as shown in FIG. 2. The method 300 begins with block 302, shown in FIG. 3, in which the vehicle computing device 104 receives a requested destination from a user of the vehicle computing device 104 (e.g., a driver, passenger, or other occupant of the advanced vehicle 102). The user may specify an address, a landmark, a business (e.g., restaurant, retail store, fueling/charging station, etc.), or other destination. The destination may be provided by the user with a touch screen, with voice input, or with any other input modality of the vehicle computing device 104.

Figure 5:
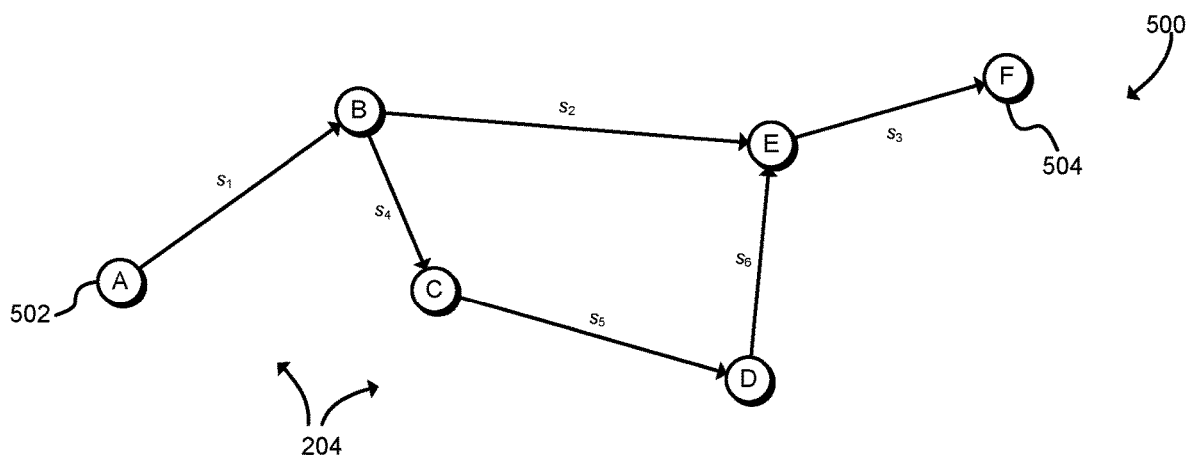
FIGS. 5-7 are schematic diagrams illustrating potential routes and route segments that may be analyzed by the vehicle computing device of FIGS. 1-2.
Figure 6:
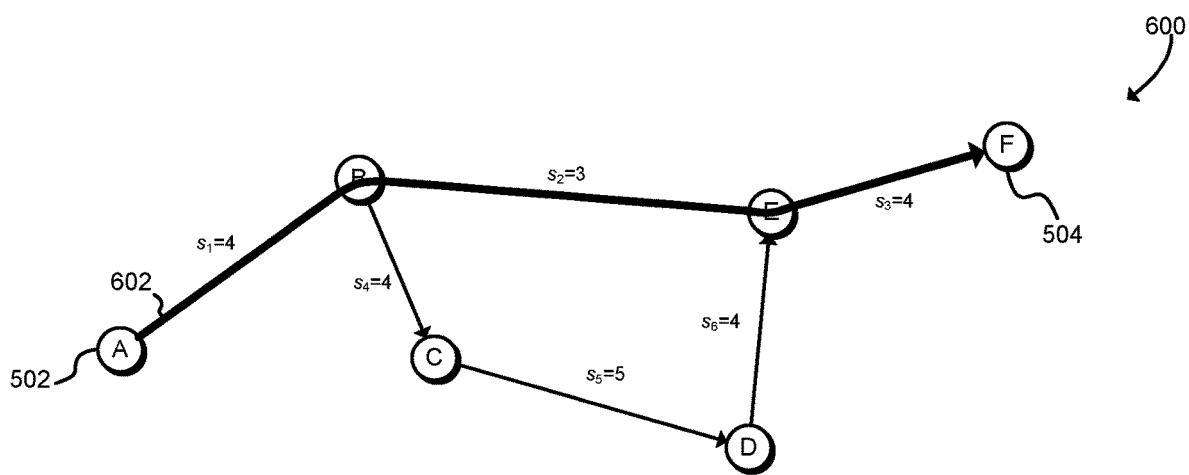
Figure 7:
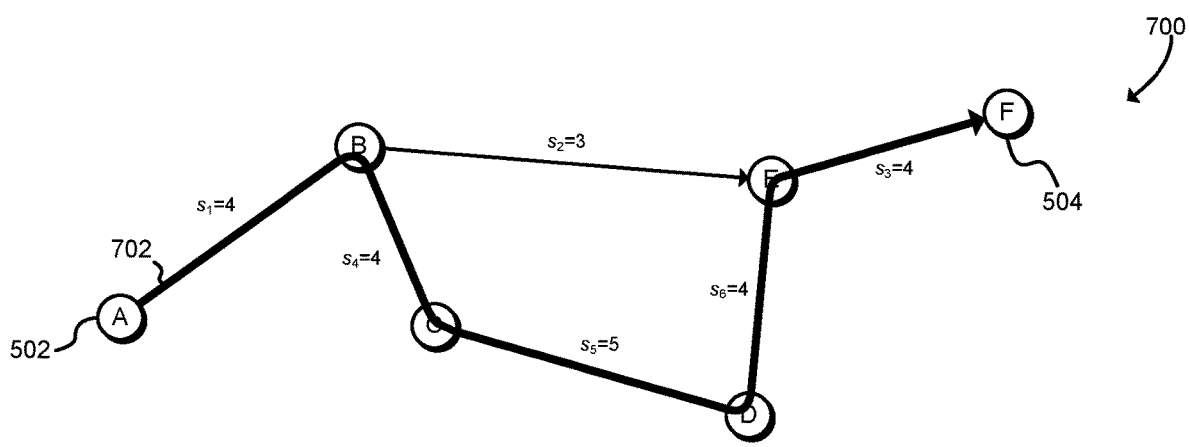

In block 304, the vehicle computing device 104 determines route segments 204 for one or more routes to the destination. Each route segment 204 may represent a road, driveway, highway, intersection, interchange, road segment, or other part of a route to the destination. The vehicle computing device 104 may determine multiple different routes to the destination. Certain route segments 204 may be shared between multiple routes to the destination. The routes may start at the current location of the advanced vehicle 102 or at another starting location. Illustrative routes and route segments 204 are shown in FIGS. 5-7 and described below.

In block 306, the vehicle computing device 104 determines one or more autonomous driving factors 208 for each route segment 204. Each autonomous driving factor 208 is indicative of an autonomy level achievable by the advanced vehicle 102 for that corresponding route segment 204. In some embodiments, the autonomous driving factors 208 may be embodied as numeric values or other data corresponding to autonomy levels such as the autonomy levels specified by SAE International (e.g., numeric values 1 to 5 or scaled equivalents between 0 and 1). The autonomous driving factors 208 may be determined based on diagnostic data, status data, or other data generated by the advanced vehicle 102 or based on data received from one or more external data services 110.

In some embodiments, in block 308 the vehicle computing device 104 may determine high-definition map availability for each route segment 204. Operating the advanced vehicle 102 at higher autonomy levels (e.g., partially autonomy, conditional autonomy, high autonomy, and/or full autonomy) may require high-definition or other detailed map data for the associated route segment 204. Similarly, route segments 204 with less-detailed map data available may require user intervention and/or control of the advanced vehicle 102 and thus indicate a lower autonomy level. The vehicle computing device 104 may determine whether high-definition map data is available from an external data service 110 (e.g., a mapping server or other geographic information service) or otherwise accessible by the vehicle computing device 104. The value of the autonomous driving factor 208 may be proportional to high-definition map availability for the corresponding route segment 204.

In some embodiments, in block 310, the vehicle computing device 104 may determine weather conditions for each route segment 204. Operating the advanced vehicle 102 at higher autonomy levels (e.g., partially autonomy, conditional autonomy, high autonomy, and/or full autonomy) may be possible only in certain weather conditions. For example, sensor data quality produced by certain sensors 106 of the advanced vehicle 102 may depend on visibility, fog, rain, snow, or other weather conditions. As another example, the motor/actuator system 108 may require certain weather conditions to control motion of the advanced vehicle 102. Thus, route segments 204 with certain weather conditions (e.g., poor visibility, rain, snow, or other conditions) may require user intervention and/or control of the advanced vehicle 102 and thus indicate a lower autonomy level. The vehicle computing device 104 may receive weather conditions data from an external data service 110 such as a weather server, from sensors 106 of the advanced vehicle 102, and/or from other sources. The value of the autonomous driving factor 208 may be proportional to relative visibility, precipitation, or other weather conditions.

In some embodiments, in block 312 the vehicle computing device 104 may determine road and/or traffic conditions for each route segment 204. For example, the vehicle computing device 104 may identify road closures, traffic hazards, road construction, traffic jams, congestion, or road and/or traffic conditions. The autonomy level associated with road and/or traffic conditions may depend on capabilities of the particular advanced vehicle 102. For example, certain advanced vehicles 102 may require user intervention for route segments 204 with traffic hazards, road closures, or other road conditions. As another example, certain advanced vehicles 102 may provide full automation for route segments 204 with slow-speed traffic jams but require user control for route segments 204 with free-flowing traffic. The vehicle computing device 104 may receive the road and/or traffic conditions from a data service 110 such as a crowdsourced traffic data server or other data source.

In block 314, the vehicle computing device 104 may determine vehicle capabilities and/or health, including sensor 106 availability. For example, operating the advanced vehicle 102 at higher autonomy levels (e.g., partially autonomy, conditional autonomy, high autonomy, and/or full autonomy) may require certain sensors 106 (e.g., camera, lidar, or other sensors) to be operating correctly. If certain sensors 106 are inoperable or otherwise unavailable, the advanced vehicle 102 may require user intervention or control. Thus, the value of the autonomous driving factor 208 may indicate full autonomy (e.g., level 5) if the required sensors 106 are available and the lowest autonomy (e.g., level 0 or level 1) if the required sensors 106 are not available.

After determining the autonomous driving factors 208, in block 316 the vehicle computing device 104 determines an autonomous driving quality of service (QoS) score for each route segment 204. The QoS score may be embodied as a numeric value or other data corresponding to an autonomy level achievable by the advanced vehicle 102 for the corresponding route segment 204. In some embodiments, each QoS score may be determined as a weighted average of the autonomous driving factors 208 associated with each route segment 204. For example, a QoS score may be determined using Equation 1, below. In Equation 1, the QoS score Q is determined using as the sum of the n products of a vector of autonomous driving factors v and a vector of weights w. Illustratively, each autonomous driving factor $v_i$ may be a numeric value scaled from 1 to 5, corresponding to autonomy level. The weights w sum to 1. The value of each weight may be determined based on domain knowledge and the particular advanced vehicle 102. For example, sensor health may be weighted more than high-definition map availability, and so on. Example calculations of the autonomous QoS score Q are described further below in connection with FIGS. 5-7.

$$Q = \sum_{i=1}^{n} v_i w_i \qquad (1)$$

In block 318, the vehicle computing device 104 ranks candidate routes based on the autonomous QoS scores 210 of the route segments 204 of the route and any applicable user policies 214. The user policies 214 may include any thresholds, preferences, or other criteria that may be evaluated to rank one potential route over another. In some embodiments, in block 320, the vehicle computing device 104 may rank the routes based on autonomy level. For example, in some embodiments, the vehicle computing device 104 may rank a route according to an average autonomy level, a weighted average autonomy level, or another composite autonomy level determined based on the QoS scores 210 of the route segments 204 included in that route. As another example, vehicle computing device 104 may rank routes by comparing the QoS scores 210 of each route segments 204 to a threshold QoS score 210. Continuing that example, the user may specified a minimum autonomy level 3 (conditional automation), in which example the vehicle computing device 104 may reject routes that include any route segment 204 with a QoS score 210 below level 3. Similarly, in some embodiments, in block 322 the vehicle computing device 104 may rank the routes based on variation in autonomy level between the route segments 204. For example, a user may prefer that the entire trip remain at the same autonomy level rather than switching between higher and lower autonomy levels for different route segments 204.

In some embodiments, in block 324, the vehicle computing device 104 may rank the routes based on historic driving data. For example, the vehicle computing device 104 may prefer routes that the user has driven in the past. In some embodiments, in block 326 the vehicle computing device 104 may rank the routes based on length or time of the route. For example, the vehicle computing device 104 may prefer routes that are shorter in time and/or distance.

It should be understood that in some embodiments, routes may be ranked by a weighted average or other combination of one or more user policies 214, for example based on a combination of autonomy level, autonomy level variation, historic data, length of route, and/or time of route. The user may provide relative weighting factors for those criteria. In some embodiments, a ranking value for a route may be determined using Equation 2, below. In Equation 2, $Q_i$ is the QoS score of route segment 204 number i, Sl is the length of the route segment 204, St is the total length of all route segments 204 in the route, F indicates the frequency of use of the route by the user, VRl indicates variation in autonomy level of the route, and $t_d$ is the time to the destination for the route. The values $W_1$, $W_2$, $W_3$, $W_4$, and $W_5$ are weighting factors, which may be included in the user policies 214 or otherwise provided by the user.

$$\text{Rank} = W_1 \sum \frac{Q_i Sl}{St} + W_2 F + W_3 VRl + W_4 St + W_5 t_d \qquad (2)$$

In block 328, shown in FIG. 4, the vehicle computing device 104 displays a proposed route to the user. The proposed route may be, for example, the top-ranked route based on the ranking determined in block 318. The proposed route may be displayed as a map on the display 130 or otherwise communicated to the user of the advanced vehicle 102. In some embodiments, the vehicle computing device 104 may display the autonomous QoS score 210 for each route segment 204, for example by displaying an autonomous driving level or other indication of the autonomous QoS score 210.

In block 330, the vehicle computing device 104 receives a route selection from the user. For example, the user may accept the proposed route or indicate that the proposed route is not acceptable. The vehicle computing device 104 may receive the route selection with a touch screen, voice input, or any other available input modality of the vehicle computing device 104. In block 332, the vehicle computing device 104 determines whether a route has been selected by the user. If so, the method 300 advances to block 336, described below. If no route has been selected, the method 300 branches to block 334, in which the vehicle computing device 104 may propose an alternate route to the user. For example, the vehicle computing device 104 may select the next-highest-ranked route based on the ranking determined in block 318 or another route determined by the vehicle computing device 104. After proposing the alternate route, the method 300 loops back to block 328 to display the proposed alternate route to the user and receive a user selection. If no routes remain or a route is otherwise not selected, the vehicle computing device 104 may halt the method 300, indicate an error, or otherwise stop the current user interaction.

Referring back to block 332, if the user selects a route, the method 300 advances to block 336, in which the vehicle computing device 104 displays the selected route to the user. The route may be displayed as a map on the display 130 or otherwise communicated to the user of the advanced vehicle 102. In some embodiments, the vehicle computing device 104 may display the autonomous QoS score 210 for each route segment 204, for example by displaying an autonomous driving level or other indication of the autonomous QoS score 210.

In block 338, the advanced vehicle 102 drives the selected route using an available autonomy level. The available autonomy level depends on the route segment 204 currently being driven by the advanced vehicle 102. As described above, the autonomy level may be any level of vehicle automation, including driver assistance, partial automation, conditional automation, high automation, or full automation. The autonomous driving features of the advanced vehicle 102 may be controlled by the vehicle computing device 104, the motor/actuator system 108, and/or other control systems of the advanced vehicle 102. In some embodiments, in block 340 the vehicle computing device 104 may notify the user of changes in autonomy level. For example, the vehicle computing device 104 may provide advanced warning to the user when the advanced vehicle 102 nears a route segment 204 with a reduced autonomous QoS score 210 as compared to the current route segment 204. The vehicle computing device 104 may notify the user with the display 130, a voice alert, or any other user interface modality.

In block 342, the vehicle computing device 104 monitors for updated autonomous driving factors 208. The vehicle computing device 104 may monitor for updated diagnostic data, status data, or other data generated by the advanced vehicle 102 or for updated data received from one or more external data services 110. For example, the vehicle computing device 104 may monitor for updated high-definition map availability data, updated weather condition data, or updated road or traffic condition data. As another example, the vehicle computing device 104 may monitor for updated vehicle capability and/or health data, including updated sensor 106 availability data. In block 344, the vehicle computing device 104 determines whether the autonomous driving factors 208 have been updated. If not, the method 300 loops back to block 338 to continue driving the selected route. If the autonomous driving factors 208 have been updated, the method 300 loops back to block 316, shown in FIG. 3, to update the autonomous QoS scores 210 based on the updated autonomous driving factors 208. If the autonomous QoS scores 210 change, the vehicle computing device 104 may re-rank potential routes to the destination and proposed an updated route to the user as described above. The vehicle computing device 104 may continue driving the route and monitoring for updated autonomous driving factors 208 until the advanced vehicle 102 reaches the destination or otherwise ends the current trip.

Referring now to FIG. 5, diagram 500 illustrates potential routes and route segments 204 for an illustrative trip in an advanced vehicle 102. The diagram 500 shows a starting position 502, labeled node A, and a destination 504, labeled node F. Nodes B through E represent intersections, waypoints, addresses, or other positions between the starting position 502 and the destination 504. Each of those nodes is connected by a route segment 204, which are illustratively labeled segments $s_1$ through $s_6$.

As described above, each route segment 204 may be associated with multiple autonomous driving factors 208. Those autonomous driving factors 208 may be processed using Equation 1, above, to determine an autonomous QoS score 210 for each route segment 204. Table 1, shown below, illustrates example autonomous driving factors 208 and resulting QoS scores 210 for the illustrative route segments 204 shown in FIG. 5. In Table 1, factor $v_1$ indicates high-definition map availability, factor $v_2$ indicates GPS availability, factor $v_3$ indicates sensor health, factor $v_4$ indicates road conditions, factor $v_5$ indicates weather conditions, and factor $v_6$ indicates traffic conditions. As shown, each factor $v_1$ through $v_6$ is scaled from 1 to 5, corresponding to potential autonomous driving levels. Of course, in other embodiments, the factors $v_1$ through $v_6$ may be embodied as different values and/or scales, such as floating point values from 0.0 (corresponding to autonomous level 1) to 1.0 (corresponding autonomous level 5). Weights $w_1$ through $w_6$ correspond to factors $v_1$ through $v_6$ and are determined based on domain knowledge and the particular advanced vehicle 102. The autonomous QoS scores Q for each segment $s_1$ through $s_6$ are determined using Equation 1 as described above and are illustratively rounded to the nearest integer value. As shown, illustrative segments $s_1$, $s_3$, $s_4$, and $s_6$ have autonomous QoS scores Q corresponding to autonomous driving level 4, segment $s_2$ has autonomous QoS score Q corresponding to autonomous driving level 3, and segment $s_5$ autonomous QoS score Q corresponding to autonomous driving level 5.

TABLE 1

Illustrative Autonomous Driving Factors and Autonomous QoS Scores

| | $v_1$ | $v_2$ | $v_3$ | $v_4$ | $v_5$ | $v_6$ | $w_1$ | $w_2$ | $w_3$ | $w_4$ | $w_5$ | $w_6$ | Q |
|---|---|---|---|---|---|---|---|---|---|---|---|---|---|
| $s_1$ | 5 | 5 | 4 | 3 | 4 | 4 | 0.25 | 0.15 | 0.3 | 0.15 | 0.1 | 0.05 | 4 |
| $s_2$ | 4 | 5 | 4 | 1 | 1 | 1 | 0.25 | 0.15 | 0.3 | 0.15 | 0.1 | 0.05 | 3 |
| $s_3$ | 5 | 5 | 4 | 3 | 4 | 4 | 0.25 | 0.15 | 0.3 | 0.15 | 0.1 | 0.05 | 4 |
| $s_4$ | 5 | 5 | 4 | 3 | 4 | 4 | 0.25 | 0.15 | 0.3 | 0.15 | 0.1 | 0.05 | 4 |
| $s_5$ | 5 | 5 | 5 | 5 | 5 | 5 | 0.25 | 0.15 | 0.3 | 0.15 | 0.1 | 0.05 | 5 |
| $s_6$ | 5 | 5 | 4 | 3 | 4 | 4 | 0.25 | 0.15 | 0.3 | 0.15 | 0.1 | 0.05 | 4 |

Referring now to FIG. 6, diagram 600 illustrates one potential route 602 from the starting position 502 to the destination 504. As shown, the route 602 includes route segments $s_1$, $s_2$, and $s_3$. The route 602 may be selected, for example, as the path with the shortest distance and/or drive time between the starting position 502 to the destination 504. However, note that segment $s_2$ has an autonomous QoS score 210 equivalent to autonomous driving level 3, and thus the advanced vehicle 102 may require increased user supervision/intervention while driving that segment.

Referring now to FIG. 7, diagram 700 illustrates another potential route 702 from the starting position 502 to the destination 504. As shown, the route 702 includes route segments $s_1$, $s_4$, $s_5$, $s_6$, and $s_3$. The route 702 may be selected, for example, based on a user policy 214 that defines a minimum acceptable autonomous QoS score 210. As shown, every segment of the route 702 has an autonomous QoS score 210 greater than or equal to autonomous driving level 4. Thus, the advanced vehicle 102 may drive the entire route 702 without changing to autonomous driving level 3.

It should be appreciated that, in some embodiments, the method 300 may be embodied as various instructions stored on a computer-readable media, which may be executed by the processor 120 and/or other components of the vehicle computing device 104 to cause the vehicle computing device 104 to perform the method 300. The computer-readable media may be embodied as any type of media capable of being read by the vehicle computing device 104 including, but not limited to, the memory 124, the data storage device 126, firmware devices, other memory or data storage devices of the vehicle computing device 104, portable media readable by a peripheral device 134 of the vehicle computing device 104, and/or other media.

EXAMPLES

Illustrative examples of the technologies disclosed herein are provided below. An embodiment of the technologies may include any one or more, and any combination of, the examples described below.

Example 1 includes a computing device for autonomous driving route selection, the computing device comprising: a pathfinder to determine a plurality of route segments of one or more routes to a destination; and a segment analyzer to determine, for each of the plurality of route segments, one or more autonomous driving factors associated with the route segment, wherein each autonomous driving factor is indicative of an autonomy level achievable by a vehicle for the associated route segment, and (ii) determine, for each of the plurality of route segments, an autonomous quality of service score based on the associated one or more autonomous driving factors.

Example 2 includes the subject matter of Example 1, and wherein each autonomous driving factor comprises a high-definition map availability, a weather condition, a road condition, a traffic condition, a sensor capability, or a sensor health factor.

Example 3 includes the subject matter of any of Examples 1 and 2, and wherein to determine the autonomous quality of service score comprises to determine a weighted average of the associated one or more autonomous driving factors.

Example 4 includes the subject matter of any of Examples 1-3, and further comprising a path ranker to rank the one or more routes to the destination based on the autonomous quality of service scores associated with the plurality of route segments, wherein the one or more routes to the destination comprises a plurality of routes to the destination.

Example 5 includes the subject matter of any of Examples 1-4, and wherein to rank the one or more routes further comprises to rank the one or more routes based on a user policy.

Example 6 includes the subject matter of any of Examples 1-5, and wherein to rank the one or more routes based on the user policy comprises to rank the one or more routes based on a predetermined threshold autonomous quality of service score.

Example 7 includes the subject matter of any of Examples 1-6, and wherein to rank the one or more routes based on the user policy comprises to rank the one or more routes based on a variation in autonomous quality of service scores, based on historic driving data of a user, based on total time of the one or more routes, or based on total distance of the one or more routes.

Example 8 includes the subject matter of any of Examples 1-7, and further comprising: a user interface to display a proposed route to a user; wherein the path ranker is further to select the proposed route from the plurality of routes to the destination in response to ranking of the one or more routes to the destination.

Example 9 includes the subject matter of any of Examples 1-8, and wherein the user interface is further to receive a selected route from the user in response to display of the proposed route to the user.

Example 10 includes the subject matter of any of Examples 1-9, and further comprising: an in-trip updater to monitor the one or more autonomous driving factors for each of the plurality of route segments during a trip by the vehicle; wherein the segment analyzer is further to update, for each of the plurality of route segments, the autonomous quality of service score based on the associated one or more autonomous driving factors in response to monitoring of the one or more autonomous driving factors.

Example 11 includes the subject matter of any of Examples 1-10, and further comprising a path ranker to: rank the one or more routes to the destination based on the autonomous quality of service scores associated with the plurality of route segments in response to updating of the autonomous quality of service score; and select a proposed re-routing from the plurality of routes to the destination in response to ranking of the one or more routes to the destination.

Example 12 includes the subject matter of any of Examples 1-11, and further comprising a user interface to alert a user of a change in the autonomous quality of service score associated with an upcoming route segment during a trip by the vehicle.

Example 13 includes a method for autonomous driving route selection, the method comprising: determining, by a computing device, a plurality of route segments of one or more routes to a destination; determining, by the computing device for each of the plurality of route segments, one or more autonomous driving factors associated with the route segment, wherein each autonomous driving factor is indicative of an autonomy level achievable by a vehicle for the associated route segment; and determining, by the computing device for each of the plurality of route segments, an autonomous quality of service score based on the associated one or more autonomous driving factors.

Example 14 includes the subject matter of Example 13, and further comprising ranking, by the computing device, the one or more routes to the destination based on the autonomous quality of service scores associated with the plurality of route segments, wherein the one or more routes to the destination comprises a plurality of routes to the destination.

Example 15 includes the subject matter of any of Examples 13 and 14, and wherein ranking the one or more routes further comprises ranking the one or more routes based on a user policy.

Example 16 includes the subject matter of any of Examples 13-15, and wherein ranking the one or more routes based on the user policy comprises ranking the one or more routes based on a predetermined threshold autonomous quality of service score.

Example 17 includes the subject matter of any of Examples 13-16, and further comprising: monitoring, by the computing device, the one or more autonomous driving factors for each of the plurality of route segments during a trip by the vehicle; and updating, by the computing device for each of the plurality of route segments, the autonomous quality of service score based on the associated one or more autonomous driving factors in response to monitoring the one or more autonomous driving factors.

Example 18 includes the subject matter of any of Examples 13-17, and further comprising: ranking, by the computing device, the one or more routes to the destination based on the autonomous quality of service scores associated with the plurality of route segments in response to updating the autonomous quality of service score; and selecting, by the computing device, a proposed re-routing from the plurality of routes to the destination in response to ranking the one or more routes to the destination.

Example 19 includes one or more computer-readable storage media comprising a plurality of instructions stored thereon that, in response to being executed, cause a computing device to: determine a plurality of route segments of one or more routes to a destination; determine, for each of the plurality of route segments, one or more autonomous driving factors associated with the route segment, wherein each autonomous driving factor is indicative of an autonomy level achievable by a vehicle for the associated route segment; and determine, for each of the plurality of route segments, an autonomous quality of service score based on the associated one or more autonomous driving factors.

Example 20 includes the subject matter of Example 19, and further comprising a plurality of instructions stored thereon that, in response to being executed, cause a computing device to rank the one or more routes to the destination based on the autonomous quality of service scores associated with the plurality of route segments, wherein the one or more routes to the destination comprises a plurality of routes to the destination.

Example 21 includes the subject matter of any of Examples 19 and 20, and wherein to rank the one or more routes further comprises to rank the one or more routes based on a user policy.

Example 22 includes the subject matter of any of Examples 19-21, and wherein to rank the one or more routes based on the user policy comprises to rank the one or more routes based on a predetermined threshold autonomous quality of service score.

Example 23 includes the subject matter of any of Examples 19-22, and further comprising a plurality of instructions stored thereon that, in response to being executed, cause a computing device to: monitor the one or more autonomous driving factors for each of the plurality of route segments during a trip by the vehicle; and update, for each of the plurality of route segments, the autonomous quality of service score based on the associated one or more autonomous driving factors in response to monitoring the one or more autonomous driving factors.

Example 24 includes the subject matter of any of Examples 19-23, and further comprising a plurality of instructions stored thereon that, in response to being executed, cause a computing device to: rank the one or more routes to the destination based on the autonomous quality of service scores associated with the plurality of route segments in response to updating the autonomous quality of service score; and select a proposed re-routing from the plurality of routes to the destination in response to ranking the one or more routes to the destination.

Example 25 includes the subject matter of any of Examples 19-24, and further comprising a plurality of instructions stored thereon that, in response to being executed, cause a computing device to alert a user of a change in the autonomous quality of service score associated with an upcoming route segment during a trip by the vehicle.

The invention claimed is:

1. A computing device for autonomous driving route selection, the computing device comprising:
a data processor;
a memory;
a pathfinder executable by the data processor to determine, from map data stored in the memory, a plurality of route segments of one or more routes to a destination; and
a segment analyzer executable by the data processor to autonomously determine, for each of the plurality of route segments, a plurality of different autonomous driving factors associated with the route segment, wherein each autonomous driving factor is indicative of an autonomy level achievable by a vehicle for the associated route segment, and determine, for each of the plurality of route segments, an autonomous quality of service score based on the associated plurality of different autonomous driving factors, wherein the autonomous quality of service score for each of the plurality of route segments is determined based on a weighted average of the associated plurality of different autonomous driving factors determined for a corresponding one of the route segments, wherein a respective weighting value is assigned to each of the plurality of different autonomous driving factors and the weighted average is calculated using the weighting values for the plurality of different autonomous driving factors;
a path ranker to rank the one or more routes to the destination based on the autonomous quality of service scores associated with the plurality of route segments, wherein the rank is determined based on a user-defined ranking policy; and
a controller to select a particular route and selectively automate navigation of a vehicle during at least a portion of the plurality of route segments of the route based on the determined autonomous quality of service scores, wherein autonomous navigation of the vehicle by the controller is different in at least two of the plurality of route segments in the route based on differences in the determined autonomous quality of service scores for the two route segments.

2. The computing device of claim 1, wherein each autonomous driving factor comprises one or more of a high-definition map availability, a weather condition, a road condition, a traffic condition, a sensor capability, or a sensor health factor.

3. The computing device of claim 1, wherein to rank the one or more routes based on the user-defined ranking policy comprises to rank the one or more routes based on a predetermined threshold autonomous quality of service score.

4. The computing device of claim 1, wherein to rank the one or more routes based on the user-defined ranking policy comprises to rank the one or more routes based on a variation in one or more of autonomous quality of service scores, historic driving data of a user, total time of the one or more routes, or total distance of the one or more routes.

5. The computing device of claim 1, further comprising:
a graphical user interface device to display a proposed route to a user;
wherein the path ranker is further configured to select the proposed route from the plurality of routes to the destination in response to ranking of the one or more routes to the destination.

6. The computing device of claim 5, wherein the user interface is further configured to receive a selected route from the user in response to display of the proposed route to the user and the particular route is selected based on selection of the selected route by the user.

7. The computing device of claim 1, further comprising:
an in-trip updater to monitor the one or more autonomous driving factors for each of the plurality of route segments during a trip by the vehicle;
wherein the segment analyzer is further configured to update, for each of the plurality of route segments, the autonomous quality of service score based on the associated one or more autonomous driving factors in response to monitoring of the one or more autonomous driving factors.

8. The computing device of claim 7, wherein the path ranker is to:
rank the one or more routes to the destination based on the autonomous quality of service scores associated with the plurality of route segments in response to updating of the autonomous quality of service score; and
select a proposed re-routing from the plurality of routes to the destination in response to ranking of the one or more routes to the destination.

9. The computing device of claim 1, further comprising a user interface to alert a user of a change in the autonomous quality of service score associated with an upcoming route segment during a trip by the vehicle.

10. A method for autonomous driving route selection, the method comprising:
determining, by a computing device, a plurality of route segments of one or more routes to a destination;
determining, by the computing device for each of the plurality of route segments, a plurality of different autonomous driving factors associated with the route segment, wherein each autonomous driving factor is indicative of an autonomy level achievable by a vehicle for the associated route segment;
determining, by the computing device for each of the plurality of route segments, an autonomous quality of service score based on the associated plurality of different autonomous driving factors, wherein the autonomous quality of service score is determined based on a weighted average of the associated plurality of different autonomous driving factors, wherein a respective weighting value is assigned to each of the plurality of different autonomous driving factors and the weighted average is calculated using the weighting values for the plurality of different autonomous driving factors;
ranking the one or more routes to the destination based on the autonomous quality of service scores associated with the plurality of route segments, wherein the rank is determined based on a user-defined ranking policy; and
selectively automating navigation of a vehicle during at least a portion of the plurality of route segments based on the determined autonomous quality of service scores of the respective route segments, wherein autonomous navigation of the vehicle by the controller is different in at least two of the plurality of route segments in the route based on differences in the determined autonomous quality of service scores for the two route segments.

11. The method of claim 10, wherein ranking the one or more routes based on the user-defined ranking policy comprises ranking the one or more routes based on a predetermined threshold autonomous quality of service score.

12. The method of claim 10, further comprising:
monitoring, by the computing device, the one or more autonomous driving factors for each of the plurality of route segments during a trip by the vehicle; and
updating, by the computing device for each of the plurality of route segments, the autonomous quality of service score based on the associated one or more autonomous driving factors in response to monitoring the one or more autonomous driving factors.

13. The method of claim 12, further comprising:
ranking, by the computing device, the one or more routes to the destination based on the autonomous quality of service scores associated with the plurality of route segments in response to updating the autonomous quality of service score; and
selecting, by the computing device, a proposed re-routing from the plurality of routes to the destination in response to ranking the one or more routes to the destination.

14. One or more non-transitory computer-readable storage media comprising a plurality of instructions stored thereon that, in response to being executed, cause a computing device to:
process a set of map data to determine a plurality of route segments of one or more routes to a destination;
determine, for each of the plurality of route segments, a plurality of different autonomous driving factors associated with the route segment, wherein each autonomous driving factor is indicative of an autonomy level achievable by a vehicle for the associated route segment;
determine, for each of the plurality of route segments, an autonomous quality of service score based on the associated plurality of different autonomous driving factors, wherein the autonomous quality of service score is determined based on a weighted average of the associated plurality of different autonomous driving factors, wherein a respective weighting value is assigned to each of the plurality of different autonomous driving factors and the weighted average is calculated using the weighting values for the plurality of different autonomous driving factors;
rank the one or more routes to the destination based on the autonomous quality of service scores associated with the plurality of route segments, wherein the rank is determined based on a user-defined ranking policy; and
selectively automate navigation of a vehicle during at least a portion of the plurality of route segments based on the determined autonomous quality of service scores, wherein autonomous navigation of the vehicle by the controller is different in at least two of the plurality of route segments in the route based on differences in the determined autonomous quality of service scores for the two route segments.

15. The one or more computer-readable storage media of claim 14, wherein to rank the one or more routes based on the user-defined ranking policy comprises to rank the one or more routes based on a predetermined threshold autonomous quality of service score.

16. The one or more computer-readable storage media of claim 14, further comprising a plurality of instructions stored thereon that, in response to being executed, cause a computing device to:
monitor the one or more autonomous driving factors for each of the plurality of route segments during a trip by the vehicle; and
update, for each of the plurality of route segments, the autonomous quality of service score based on the associated one or more autonomous driving factors in response to monitoring the one or more autonomous driving factors.

17. The one or more computer-readable storage media of claim 16, further comprising a plurality of instructions stored thereon that, in response to being executed, cause a computing device to:
rank the one or more routes to the destination based on the autonomous quality of service scores associated with the plurality of route segments in response to updating the autonomous quality of service score; and
select a proposed re-routing from the plurality of routes to the destination in response to ranking the one or more routes to the destination.

18. The one or more computer-readable storage media of claim 14, further comprising a plurality of instructions stored thereon that, in response to being executed, cause a computing device to alert a user of a change in the autonomous quality of service score associated with an upcoming route segment during a trip by the vehicle.

* * * * *